United States Patent [19]

ErkenBrack

[11] Patent Number: 5,142,970

[45] Date of Patent: Sep. 1, 1992

[54] APPARATUS FOR STORING MATTER OUT OF CONTACT WITH GAS

[76] Inventor: Kenneth B. ErkenBrack, P.O. Box 4343, Charlottesville, Va. 22905

[21] Appl. No.: 840,332

[22] Filed: Feb. 24, 1992

[51] Int. Cl.⁵ .......................... A23B 7/00; A23L 3/00; B65D 33/01

[52] U.S. Cl. ...................................... 99/472; 99/467; 99/646 C; 206/524.8; 220/231; 383/63; 383/100; 383/103

[58] Field of Search ...................... 99/467, 472, 646 C, 99/473, 474; 383/3, 63, 61, 100–102, 103, 104, 127; 220/231; 206/524.8; 426/118; 229/DIG. 14

[56] References Cited

U.S. PATENT DOCUMENTS

| 24,770 | 7/1859 | Weaver | 99/472 |
|---|---|---|---|
| 370,250 | 9/1887 | Establie | 99/472 |
| 757,895 | 4/1904 | Davis | 99/472 |
| 2,576,322 | 11/1951 | Waters | 383/103 |
| 2,669,176 | 2/1954 | Lazerus | 99/472 |
| 2,913,030 | 11/1959 | Fisher | 383/63 |
| 3,715,860 | 2/1973 | Esty | 99/646 C |
| 4,016,999 | 4/1977 | Denzer | 220/231 |
| 4,449,243 | 5/1984 | Platel | 383/103 |
| 4,532,652 | 7/1985 | Herrington | 383/63 |
| 4,712,249 | 12/1987 | Gannon | 383/100 |

FOREIGN PATENT DOCUMENTS

| 0384588 | 8/1990 | European Pat. Off. | 383/63 |
|---|---|---|---|
| 2237553 | 5/1991 | United Kingdom | 383/103 |

Primary Examiner—Timothy F. Simone
Attorney, Agent, or Firm—Keith F. Goodenough

[57] ABSTRACT

The present invention is directed to an apparatus to store matter out of contact with gas. A container for storage of matter is combined with a vacuum pump for extracting gas from the container. The vacuum pump has an inlet tube in which is arranged a sealing means for locking the inlet tube and thereby preventing re-entry of gas into the container after the gas has been exhausted by the vacuum pump therefrom, and during storage. The lockable sealing means may be arranged on the inlet valve of the vacuum pump, or it may be internally located in a probe serving as the inlet tube of the vacuum pump and inserted through the container's gas tight sealing means, such as the interlocking strip closure of a food storage bag. In both instances the locking means is operated by external force. In the case where the vacuum pump is of the Venturi type, the combination incorporating the probe is employed and the probe is pinched at the area of the internal sealing device to lock the probe closed against re-entry of the gas into the container after gas-exhaustion from the container has been completed. The types of vacuum pumps employed in the embodiment of this invention include separate pumps which may be re-used in combination with other containers, or which are molded integrally with or affixed to the container.

29 Claims, 7 Drawing Sheets

APPARATUS FOR STORING MATTER OUT OF CONTACT WITH GAS

BACKGROUND OF THE INVENTION

1 Field of the Invention The present invention generally relates to an apparatus useful for storing matter out of contact with gas. Several embodiments of the present invention are particularly useful for storing food matter in a bag from which the air, prolonged contact with which would tend to cause deterioration to the food, is exhausted prior to placing the bag in a freezer for storage.

2. Description of the Background

It is desirable to store certain matter in the absence of gas, to avoid the deterioration to the matter which would occur because of chemical reactions between it and the gas. It is well known, for example, that certain foodstuffs deteriorate in the presence of air, particularly when they are stored for long periods, as in a freezer for instance. Freeze and other bags have long been available with manual ties or with closure strips to exclude gas, for example air. Examples of closure strips are those disclosed in U.S. Pat. Nos. 3,416,199, 4,186,786, 4,212,337, 4,285,105, 4,362,198, 4,363,345, and 4,829,641, and the large number of such patents indicates the perceived desirability of gas-tight seals, and so the exclusion of gas, for examples air, from storage bags and other containers.

However, it is a fact that placing matter in a container for storage, unless done in a vacuum, which would require costly apparatus not economically available for instance to a typical member of the public, almost always means that gas, for example air, is included with the storable matter in the container storage space. In the case for example of a food storage bag employing one of the closures disclosed in the above-mentioned U.S. patents, air could be manually squeezed out of the bag after the storable matter has been inserted, but it is well known that air will be retained in the folds of the bag and crevices in the storage matter and that more air will be admitted into the bag during the action of sealing the closure shut. In attempts to solve this problem of retained air, several types of unidirectional valve have been invented, so that the bag closure can be sealed before the retained air is manually squeezed out of the bag through the valve which in turn, because of its being unidirection, prevents re-entry into the bag of the air so squeezed out. Those unidirectional valves are disclosed, for example, in U.S. Pat. Nos. 2,576,322, 2,913,030, 4,532,652 and 4,712,249. However, even after the manual expulsion of air through a unidirectional valve it is well known that air remains inside the bag, trapped in the internal folds of the bag and in the crevices of the storable matter within the bag. It is to satisfy a long-felt need for a storage apparatus which will effectively extract substantially all gas, for example air, from contact with the storable matter that the present invention, comprising a container in novel combination with a vacuum pump having at its inlet a novel long-term sealing device, has been made. The large number of patents granted for containers and valves to be employed for reducing contact between stored matter and gas, but without the effective, total gas extraction and lock-sealing features of the present invention indicates the desirable utility and non-obviousness thereof.

SUMMARY OF THE INVENTION

The present invention provides a new and improved apparatus for storing matter, for example food, out of contact with potentially harmful gas, for example air.

The apparatus for storage according to the present invention comprises essentially a storage container, which may be a flexible plastic food storage bag, coupled to a vacuum pump for extracting gas from the container and discharging said gas into the surrounding atmosphere, the vacuum pump having a novel sealable and lockable inlet tube to prevent re-entry of the gas into the container. The vacuum pump, other than in the novelty of its coupling to the container may be of any conventional form and mode of operation. The present invention is disclosed herein particularly with two examples of vacuum pumps, the first example being of the compressible-body type, and the second example being of the Venturi-tube type.

The first example of vacuum pump comprises unidirectional inlet and outlet valves in conventional fashion, and a flexibly resilient compressible body containing an internal compressible pump chamber arranged to that in several versions of the preferred embodiment of the invention the pump may be operated by manually applying external force to the body, or squeezing it, and then releasing the manual force. The operation of the compressible-bodied vacuum pump is continued until all gas is extracted from the container. The unidirectional inlet valve of the first example of compressible-bodied vacuum pump is provided with a means of locking the unidirectional inlet valve sealably shut and gas-tight when the gas has been extracted, the purpose of the locking means being to prevent the re-entry of gas through the vacuum pump inlet tube into the container during storage.

The second example of vacuum pump is of the Venturi-tube type, having in conventional fashion a first tube which a reduction of gas pressure is induced according to the Bernoulli Theorem will known in the art and a second tube for extracting gas from the container. The second tube has a novel locking device to prevent re-entry of gas into the container, and is inserted through the wall of the first tube at a location where the first tube has a constriction in its diameter. When gas is forced through the first tube the pressure of the gas is reduced at the constriction according to the Bernoulli Theorem so that gas in the container is drawn through the second tube from the container. It is well-known in the art that a tube such as the first tube, in which a constriction in diameter is used to reduce the pressure of the gas passing through, is described as a Venturi tube. When the gas has been exhausted from the container the novel locking device of this invention is operated to prevent re-entry of gas to the container through the second tube. The usefulness of this invention lies in its ability to store matter out of contact with deleterious gases, and the novelty of this invention lies in the combination and means of coupling a storage container with a vacuum pump having an inlet lockable against gas re-entry.

In one version of the preferred embodiment of this present invention, a compressible-bodied vacuum pump is affixed to the wall of the container so that the opening in the wall of the container through which the gas is to be extracted forms the entry of the inlet tube of the vacuum pump. The compressible-bodied vacuum pump is equipped with unidirectional inlet and outlet flap valves and the flap of the unidirectional inlet valve is equipped with a re-entrant molding which, under force, which may be manual, snaps over a raised molding arranged around the periphery of the valve seat of the compressible-bodied vacuum pump inlet tube, thus sealing the valve against re-entry of gas through the inlet tube into the container. In addition, this embodiment may include a ribbed pump body and chamber to increase resilience when external force is applied thereto and released during the operation of the pump. In another version of the preferred embodiment of this invention, the body of the compressible-bodied vacuum pump is molded integrally with the portion of the wall of the container containing the opening through which gas is to be extracted from the container, so that the opening in the wall of the container forms the inlet of the inlet tube of the vacuum pump. In yet another version of the preferred embodiment, the inlet tube of the compressible-bodied vacuum pump is coupled to the container opening through which gas is to be extracted, but the vacuum pump, together with its unidirectional inlet and outlet valves is otherwise separate from the container.

In another version of the preferred embodiment, the unidirectional inlet valve of the compressible-bodied vacuum pump is of the floating type, in which the valve element is not attached to the inlet tube, but, during the operation of the vacuum pump when extracting gas from the container, makes sealing contact with the valve seat only when external force is applied to the body of the vacuum pump. For locking the unidirectional inlet valve shut against re-entry of gas therethrough into the container, the floating valve element has arranged at its end which enters the inlet tube an extension with a tapered molding which, under force applied on the distal end of the floating valve element, snaps through and over a raised molding arranged on the interior surface in a transverse plane normal to the axis of the inlet tube, locking the seating face of the floating valve element on to the valve seat.

It is an added useful feature of the compressible body type of vacuum pump, which, it will be appreciated, extracts gas from the container in discrete pulses, that partial gas extraction, if desired, is possible. Another useful feature is that, when all gas has been exhausted from the container, vacuum pump body 30 will not return to its undeformed position 26, thus informing the user that complete exhaustion of the gas has taken place. In yet another version of the preferred embodiment, the coupling of the vacuum pump is provided by a flexibly resilient hollow probe inserted through the gas-tight closure, which may be of the interlocking rib type, of the container, said probe being equipped with external means to mate with the probe-separated portion of the closure, so that the closure remains gas-tight. The probe has at its end distal from the container a coupling means for a conventional pump which may be of the compressible-body type, or of the Venturi-tube type, or of any other type. The probe also has a novel internal sealing means, which may be of the rib-type, and which is operated, to lock the probe shut and gas-tight when gas extraction from the container through the probe has been completed, by pinching the probe externally in the area of the internal sealing means so that the internal walls of the probe are brought together and the sealing means thereon interlock against the re-entry of gas therethrough into the container.

These and other meritorious features of the present invention will be more fully appreciated from the following description and claims.

BRIEF DESCRIPTION OF THE DRAWINGS

All figures are schematic and are not drawn to scale. If a given feature is shown in more than one figure then the same numeral is used to identify the feature in all the figures in which it appears.

While the invention will be described in connection with the presently preferred embodiment, it will be understood that it is not intended to limit the invention to that embodiment. On the contrary, it is intended to cover all alternatives, modifications, and equivalents as may be used in the spirit of the invention as defined in the appended claims.

DETAILED DESCRIPTION OF THE PREFERRED EMBODIMENT

This invention relates to an apparatus for storage of matter out of contact with gas.

There are many circumstances in which it is necessary to store matter out of contact with gas, because of likely deleterious reactions between gas and the matter to be stored. This is particularly the case where food has to be stored, for example in a freezer, in the absence of air. Since the storage of food with the minimum amount of deterioration from contact with air is a common problem, this description will feature to the greatest extent versions of the preferred embodiment of the present invention incorporating in novel combination with other elements the type of container most applicable to domestic food storage, that is, the plastic food storage bag, commonly transparent, most often used in domestic freezers. This type of bag commonly has a interlocking-rib-strip gas-tight closure, with or without color coding to indicate whether an effective gas-tight seal has been made.

Hitherto, extraction of the gas from flexible containers such as the food storage bag described above has been accomplished by manually squeezing the container after the matter to be stored has been placed inside. In the case where the container has no gas outlet valve this squeezing has to be done before the closure strip or other gas exclusion device is sealed, and the sealing process itself tends to let more gas back into the container before the seal is completed. In the case where the container has a unidirectional gas outlet valve but no vacuum pump, it is practically impossible to extract all the gas from the container since gas tends to be trapped in the internal folds of the container and crevices in the matter to be stored itself. The present invention, a novel combination of a container and vacuum pump with lockable unidirectional inlet tube overcomes the problem of uncontrollable or incomplete gas extraction for short or long term storage.

Figure 1:
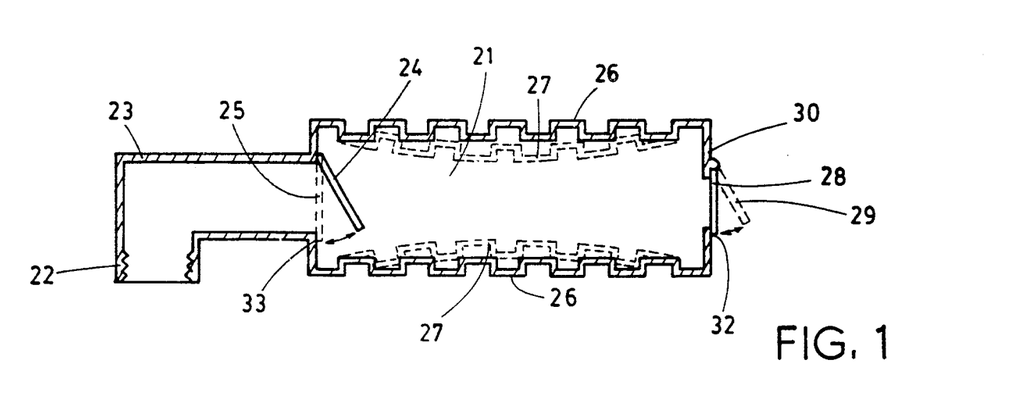
FIG. 1 is an exemplary illustration of a conventional compressible-bodied vacuum pump, operated by the application and release of manual force on the external walls of the pump body.
Figure 10:
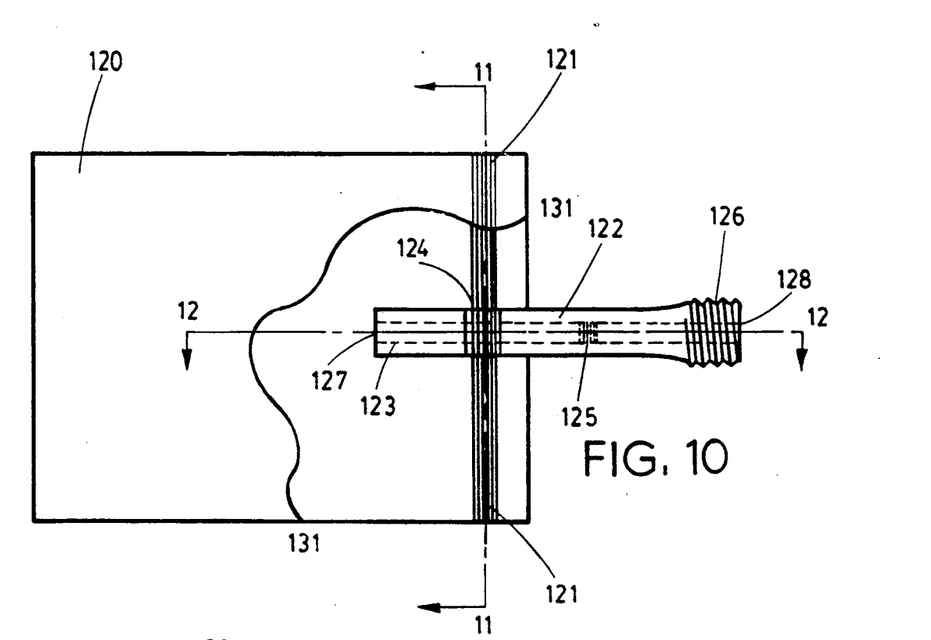
FIG. 10 shows an embodiment of the present invention having a probe inserted through the gas-tight strip closure of a storage bag, which is cut away on line 131—131 to demonstrate how the external sealing closure of the probe mates with the closure strip of the bag to form a gas-tight joint.
Figure 11:
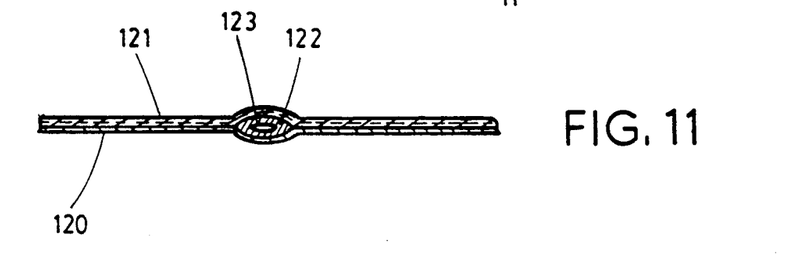
FIG. 11 shows a sectional view of the bag closure strip and the probe taken along the line 11—11 of FIG. 10.
Figure 12:
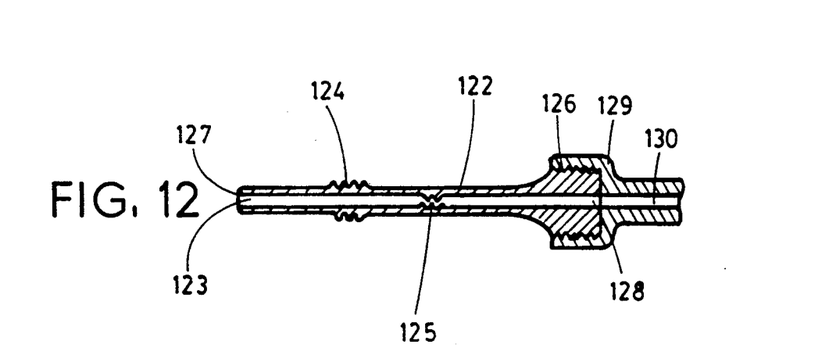
FIG. 12 shows a sectional view of the probe taken along the line 12—12 of FIG. 10, and showing schematic representations of the external interlocking rib type sealing closure of the probe and of the internal interlocking rib-type seal of the probe which is actuated by pinching the probe in the region of the seal, and also showing a conventional threaded coupling to the inlet tube of a conventional compressible-bodied vacuum pump such as those shown in FIG. 1 and FIGS. 13 and 14.

FIG. 1 shows a conventional manually-operable compressible-bodied vacuum pump which is employed in combination with probe 122 and container 120 for a version of the preferred embodiment of this invention shown in FIGS. 10, 11, and 12, but which, for the purposes of the description of that and other versions of the preferred embodiment of this invention, is illustrated to demonstrate the vacuum-pumping action of such a pump, which, with the added novel feature of a gas-tight sealable and lockable inlet tube, and in combination with a storage container, forms a version of the preferred embodiment of the present invention. In FIG. 1, in the absence of externally applied force, ribbed walls 26 of pump body 30 and of internal compressible chamber 21, made of flexibly resilient material, enclose internal compressible chamber 21 at its maximum volume, unidirectional outlet valve flap 28 is in shut position against valve seat 32, and unidirectional inlet valve flap 24 is open. Application of external force to ribbed walls 26 deforms walls 26 to position 27, consequently reducing the volume of internal compressible chamber 21 and tending to increase the pressure of gas therein, thus closing unidirectional inlet valve 24 to position 25 against valve seat 33 and opening unidirectional outlet valve flap 28 to position 29 so that the gas contained in internal compressible chamber 21 flows to atmosphere past open unidirectional outlet valve flap 28. The vacuum-pumping cycle is then complete. The next pumping cycle is commenced by releasing the external force on ribbed walls 26 so that they tend to return from position 27 to position 26 thus increasing the volume of internal compressible chamber 21 and tending to reduce the pressure of the gas remaining in chamber 21 and thereby opening the unidirectional inlet valve flap 24 so that air is drawn past it from inlet tube 23 and closing unidirectional outlet valve flap 28 against unidirectional outlet valve seat 32. It is obvious to those skilled in the art that repetition of the pumping cycle so described will evacuate gas from any container coupled to the inlet tube 23 by means of coupling means 22, shown as an example in FIG. 1 as threaded, and from any internal folds within the container and crevices in the matter to be stored. It is an added useful feature of this compressible body type of vacuum pump, which, it will be appreciated, extracts gas from the container in discrete pulses, that partial gas extraction, if desired, is possible. Another useful feature is that, when all gas has been exhausted from the container, vacuum pump body 30 will not return to its undeformed position 26, thus informing the user that complete exhaustion of the gas has taken place.

Figure 2:
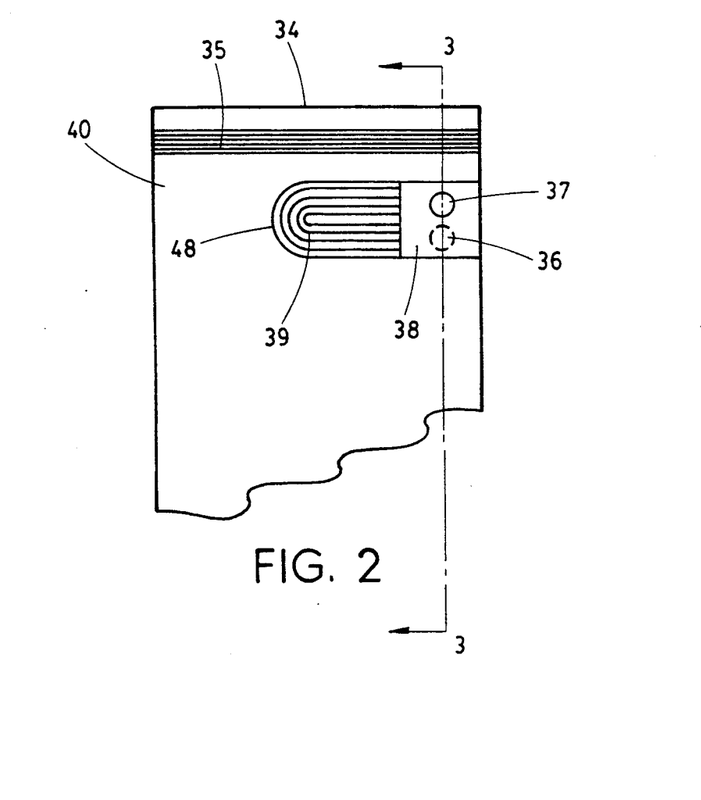
FIG. 2 is a plan view of a version of the preferred embodiment of the present invention, showing a storage bag with gas-tight strip closure and a compressible-bodied vacuum pump molded integrally, or affixed, to a wall of the storage bag, the pump having a ribbed body for manual operation by application and release of force thereon.
Figure 3:
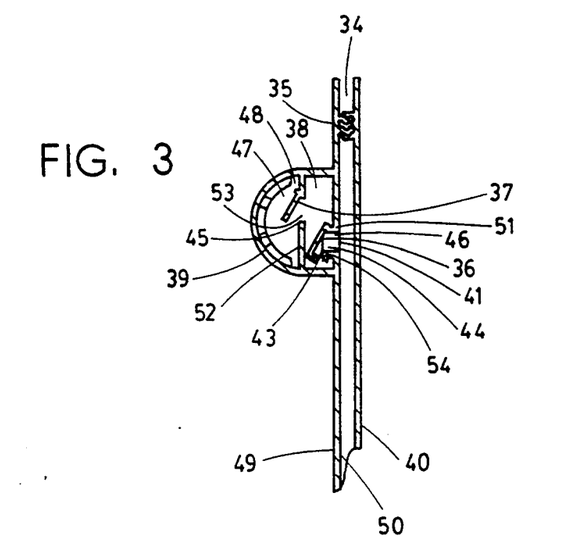
FIG. 3 is a sectional view of FIG. 2 taken on the line 3-3 therein showing the gas-tight strip closure of the bag, the compressible-bodied vacuum pump body molded integrally with the wall of the bag, the opening in the wall of the bag through which the gas is extracted from the bag, the unidirectional inlet valve with locking means on the inlet tube, the unidirectional outlet valve exhausting to atmosphere, and the end view of the ribbed portion of the pump body on which manual force is applied and released to operate the vacuum pump.

In FIG. 2 container 40, for the purposes of this description transparent flexible plastic storage bag 40, has interior and exterior surfaces and first opening 34 for introduction and extraction of the matter to be stored which is gas-tight sealable by sealing means 35 against ingress of gas, and a second opening 41 as shown in FIG. 3 for the egress of gas. Sealing means 35 may be any type of suitable gas-tight seal known in the prior art, but in the drawings and for this description the commonly used interlocking rib type closure strip molded integrally with bag 40. FIG. 2 shows a plan view of a version of the preferred embodiment of the present invention having a combination of compressible-bodied vacuum pump 48 having a compressible body 39 made of flexibly resilient material, coupled to storage container 40. In FIG. 2 the unidirectional inlet valve flap 36 of compressible bodied vacuum pump 48 is with in a portion 38 of the internal compressible chamber 47 of vacuum pump body 39 as shown in FIG. 3 which is a sectional view taken on the line 3—3 of FIG. 2. The compressible-bodied vacuum pump unidirectional outlet valve flap 37 permits gas to exhaust to atmosphere from internal chamber portion 38 of vacuum pump body 39.

Sectional view FIG. 3 shows more clearly the arrangement of the inlet 36 and outlet 37 valve flaps of compressible-bodied vacuum pump 48, and particularly relates to a version of the preferred embodiment of this present invention in which, as a novel feature of this invention, compressible-bodied vacuum pump 48 is molded integrally with exterior surface 49 of container 40 in such a position thereon that second opening 41 from interior surface 50 to exterior surface 49 of container 40, which second opening 41 is for egress of gas from container 40, forms the entrance of the proximal end of inlet tube 46 of vacuum pump 48, and substantially the whole of inlet tube 46 is within compressible chamber portion 38 of internal compressible chamber 47. The periphery of the end of inlet tube 46 proximal to container 40 is imperviously attached completely around and to the periphery of second opening 41. The end of inlet tube 46 distal from container 40, and within compressible chamber portion 38, is transversely cut in a plane normal to the axis of inlet tube 46 and forms a mounting for hinge 51 and valve seat 44 for unidirectional inlet valve flap 36, so that unidirectional inlet valve flap 36 opens in a direction outward from inlet tube 46, seating surface 57 having a diameter equal to the outer diameter of valve seat 44. It will be appreciated therefore that inlet tube 46 has an end proximal to container 40 and coupled through the wall of portion 38 of internal compressible chamber 47 for accepting gas from the second opening 41 of container 40 and a distal end, being a mounting for valve seat 44 and for hinge 51, located within said chamber portion 38, and that the operation of unidirectional inlet valve flap 36 is to permit the egress of gas from container 40 through inlet tube 46 into chamber portion 38 and to prevent the ingress of gas from chamber portion 38 into inlet tube 46 and therefrom into container 40. Outlet 53 is arranged in wall 52 of portion 38 of internal compressible chamber 47 distal from container 40 and is opened and closed according to the position of unidirectional outlet valve flap 37 which is hinged on the periphery of outlet 53 so as to open in a direction outward from said chamber portion 38. Outlet valve seat 45 upon which unidirectional outlet valve flap 37 when closing outlet 53 makes a gas-tight seat is arranged around the periphery of outlet 53 distal from chamber portion 38 and from container 40. In a version of the preferred embodiment of this invention the whole of compressible-bodied vacuum pump 48 is made of flexibly resilient material which may be polyethylene or polypropylene or another material of similar physical properties. In another version of the preferred embodiment the well-known property of polypropylene that it is particularly suitable for hinges such as those which are made for, and in many cases integral with, valve flaps is employed in that respective inlet and outlet valve flaps 36 and 37 with integral hinges are made of polypropylene, while the other parts of compressible-bodied vacuum pump 48 are made of another, flexibly resilient material. In FIGS. 2 and 3 vacuum pump body 39 having internal chamber 47 is shown as being ribbed, to increase flexible resilience of body 39, that is, to increase the tendency of internal chamber 47 of contract and expand its volume on the application and release respectively of external force on body 39.

It will be seen that the operation of the compressible-bodied vacuum pump shown in FIG. 2 and 3 in exhausting gas from container 40 is identical in principle to the operation of the conventional compressible-bodied vacuum pump shown in FIG. 1 and described above. That is to say, manual depression of, or in other words that application of external force on, the vacuum pump body 39 having internal chamber 47 causes said chamber 47 to contract in volume, in turn causing gas in chamber 47, including by definition chamber portion 38, to make its egress through outlet 53 by opening valve flap 37 while simultaneously the increased pressure of said gas closes valve flap 36, preventing ingress of gas through inlet tube 46 and second opening 41 into container 40 and completing the pumping cycle of vacuum pump 48. Release of the external force on vacuum pump body 39, shown as ribbed in FIGS. 2 and 3 to increase its flexible resilience, to tend to regain the shape it had held in the absence of external force and expand the volume of internal chamber 47, thus reducing the gas pressure therein, which in turn draws valve flap 37 closed on to valve seat 45 so that no gas can enter internal chamber 47 through outlet 53, and lifts open valve flap 36 from its seat on valve seat 44 thus drawing gas through inlet tube 46 and second opening 41 from container 40, thus commencing the next pumping cycle of compressible-bodied vacuum pump 48. It is an added useful feature of this compressible body type of vacuum pump, which, it will be appreciated, extracts gas from the container in discrete pulses, that partial gas extraction, if desired, is possible. Another useful feature is that, when all gas has been exhausted from the container, vacuum pump body 39 will not return to its undeformed position, thus informing the user that complete exhaustion of the gas has taken place.

Figure 5:
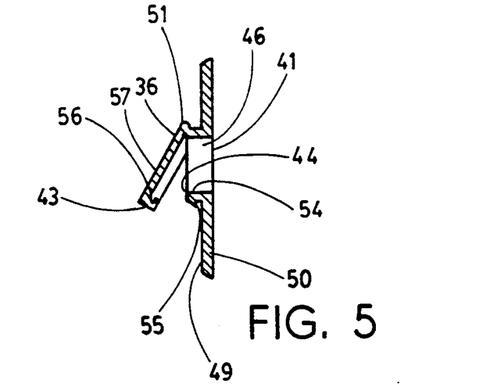
FIG. 5 shows a detailed axial sectional view of the compressible-bodied vacuum pump inlet flap valve of FIGS. 3 and 4 and on line 3—3 of FIG. 2 showing the re-entrant molding of the flap and the mating raised molding of the valve seat, for locking the valve shut when sufficient force is applied to the flap in a valve closing direction.

It is a novel feature of all versions of the preferred embodiments of this invention that a locking means is arranged on the unidirectional inlet valve of the component vacuum pump, so that after gas is exhausted from the component container by the vacuum pump the unidirectional inlet valve and also the vacuum pump inlet tube is locked shut against the ingress, that is to say leaking, of gas back into the container through the vacuum pump inlet tube. This is a particularly useful feature where long term storage out of contact with gas is desired. In the versions of the preferred embodiment of this present invention which employ in the component compressible-bodied vacuum pumps unidirectional inlet valves of the flap type, such as valve flap 36 and valve seat 44, made of flexibly resilient material, as shown in FIG. 3, the locking means comprises the elements 43 and 54 shown in FIG. 3 and in clearer detail in FIG. 5. Valve flap 36 has arranged around its periphery reentrant molding 43 projecting from valve flap 36 axially in the direction of valve seat 44. Valve seat 44, made of flexibly resilient material, has its periphery coupled by inlet tube 46 to second opening 41 of container 40 and has raised molding 54 arranged externally around and integral with said periphery. Inlet tube 46, made of flexibly resilient material, accordingly has raised molding 54 arranged circumferentially around its exterior surface at the periphery of valve seat 44, and having a planar surface 55 which is normal to the exterior surface of inlet tube 46 and is distal from valve seat 44. It will be understood that valve seating surface 57, which has a diameter equal to the outer diameter of valve seat 44, of valve flap 36, hinged by means of hinge 51 mounted at valve seat 44, provides a gas-tight seal when in contact with valve seat 44. Re-entrant edge 56 of the re-entrant molding 43 is arranged so that the axial depth of re-entrant edge 56 from seating surface 57 of valve flap 36 is equal to that of raised molding planar surface 55 from valve seat 44, so that sufficient force applied to valve flap 36 in the direction of inlet tube 46 of vacuum pump 48, that is, in a valve-closing direction, forces re-entrant molding 43 over raised molding 54 so the re-entrant molding 43 edge 56 snaps over raised molding 54 and rests in contact with planar surface 55 of raised molding 54 thus locking valve flap 36 surface 57 shut into gas-tight sealing contact with valve seat 44, and thus preventing gas from re-entering inlet tube 46 and re-entering therefrom into container 40.

Figure 4:
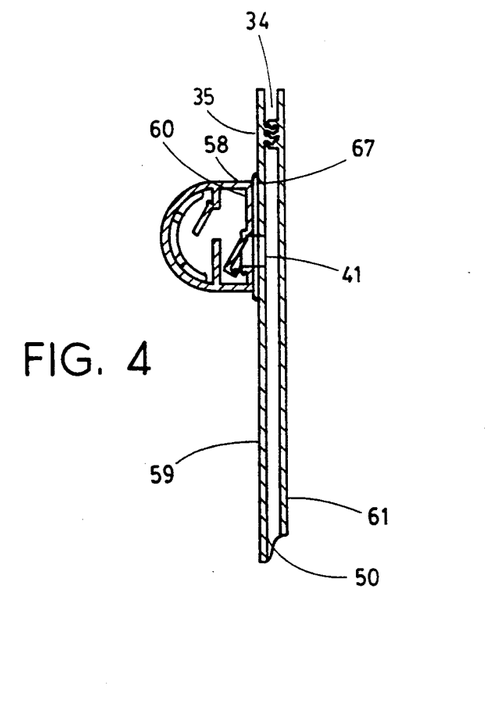
FIG. 4 shows a sectional view as in FIG. 3 but of a version of the preferred embodiment of the present invention in which the compressible-bodied vacuum pump body is affixed to the wall of the storage bag.

In another version of the preferred embodiment of this present invention shown in FIG. 4, wall 60 of compressible-bodied vacuum pump 58 is affixed by a conventional adhesive material 67 in gas-tight fashion to exterior surface 59 of container 61, as compared with the version of the preferred embodiment shown in FIG. 3 where compressible-bodied vacuum pump 48 is molded integrally with exterior surface 49 of container 40. Apart from this difference in construction, however, the function of the container and vacuum pump combination shown in FIG. 4 is identical to that in FIG. 3.

Figure 6:
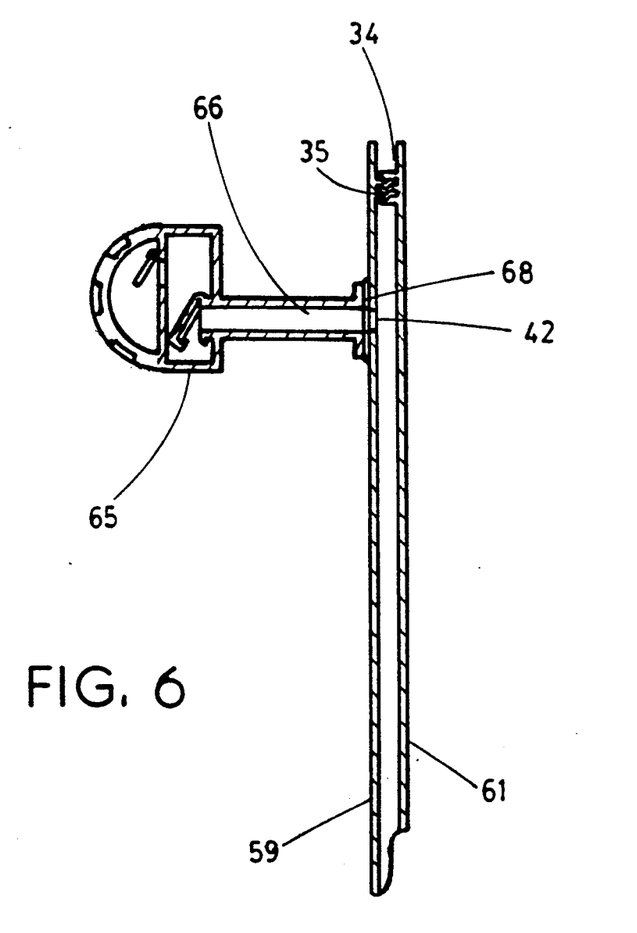
FIG. 6 shows a sectional view as in FIG. 3 but of an embodiment of the present invention in which the compressible-bodied vacuum pump is coupled to the storage bag by an extended vacuum pump inlet tube, but is otherwise separate from the storage container.

In yet another version of the preferred embodiment of this present invention shown in FIG. 6, inlet tube 66 of compressible-bodied vacuum pump 65 is affixed by a conventional adhesive material 68 to exterior surface 59 of container 61, so that vacuum pump 65 is coupled to opening 42 of container 61 by inlet tube 66 but is otherwise separate from container 61. The embodiment shown in FIG. 6 compares with the version of the preferred embodiment shown in FIG. 3 where compressible-bodied vacuum pump 48 is molded integrally with exterior surface 49 of container 40. Apart from this difference in construction, however, the function of the container and compressible-bodied vacuum pump combination shown in FIG. 6 is identical to that in FIG. 3.

Figure 7:
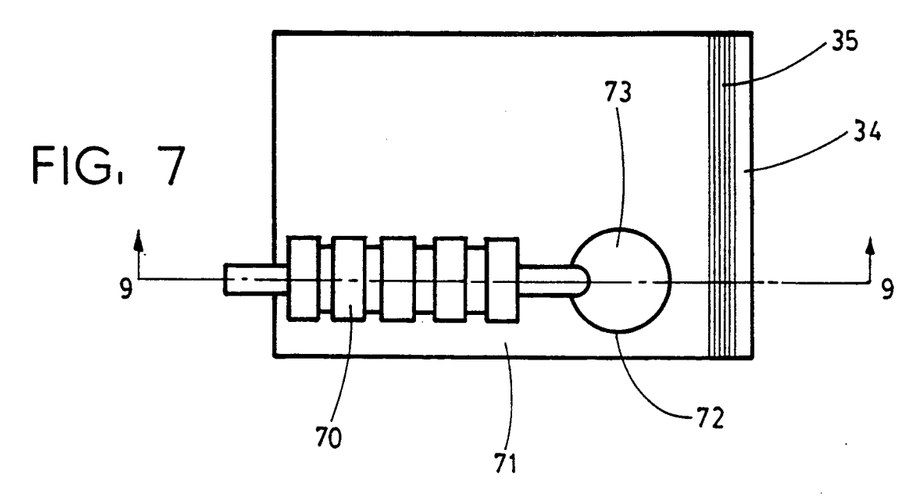
FIG. 7 shows a plan view of the present invention in a version of the preferred embodiment where the unidirectional inlet valve of the compressible-bodied vacuum pump is of the floating valve element type.

FIG. 7 shows the plan view of yet another version of the preferred embodiment of this present invention in which compressible-bodied vacuum pump having body 70 is affixed to container 71. The vacuum pump has a unidirectional inlet valve of the floating type as shown in detail in the sectional and isometric view of FIG. 8, the sectioned portion of FIG. 8 being taken along the line 9—9 of FIG. 7, as is the sectional view of the container and compressible-bodied vacuum pump combination which forms this version of the preferred embodiment shown in FIG. 9. In FIG. 7 the floating-type unidirectional inlet valve is situated within unidirectional inlet valve housing 72 which is part of the vacuum pump body 70, housing 72 having an exterior surface 73 normal to the axis of the unidirectional inlet valve element 74 shown in FIGS. 8 and 9. The vacuum pump body 70 is made of similar flexibly resilient materials to those of the vacuum pumps shown in FIGS. 1, 2, 3, 4, and 6. The operation of compressible-bodied vacuum pump 70 is similar in principle to that described above in respect of the compressible-bodied vacuum pump 60 shown in FIG. 1.

Figure 8:
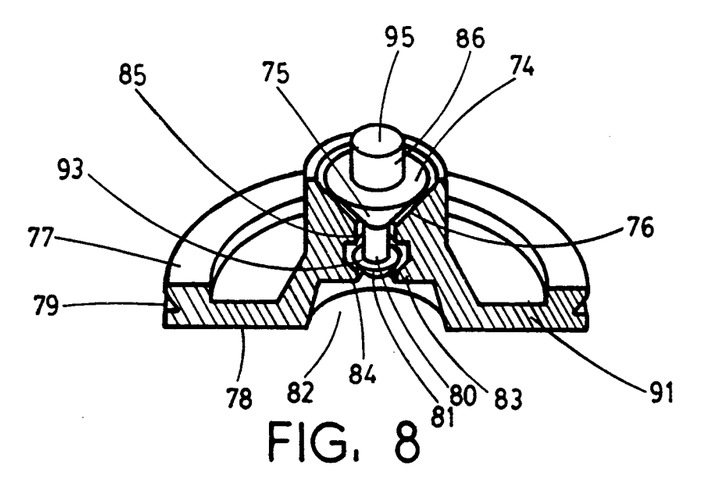
FIG. 8 shows an isometric and axial sectional view of the floating unidirectional inlet valve of FIG. 7. For clarity, floating valve element 54 is not sectioned.
Figure 9:
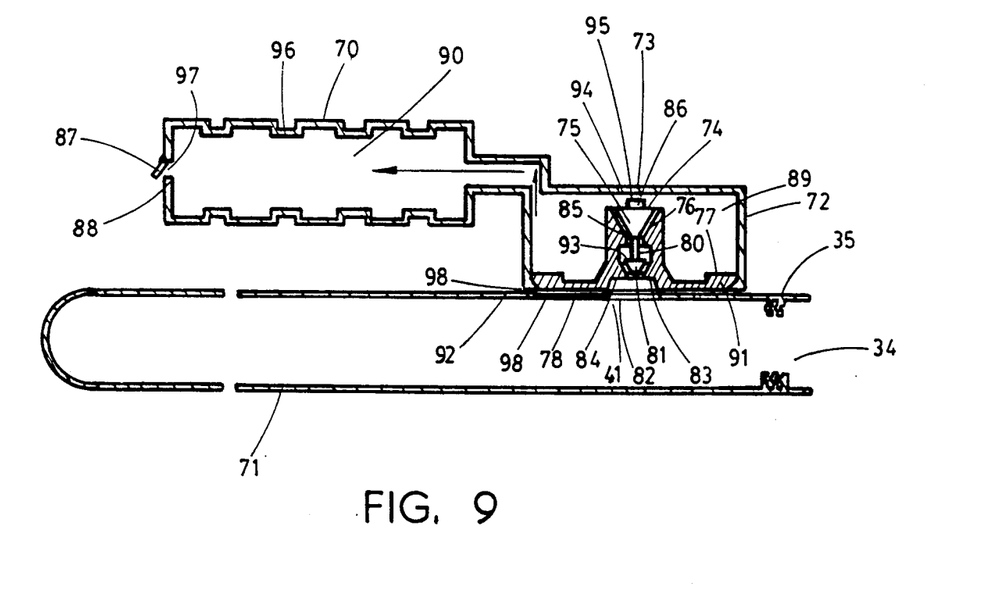
FIG. 9 shows a sectional view of the version of the preferred embodiment of the present invention shown in FIG. 7 taken along the line 9-9 therein, and showing a compressible-bodied vacuum pump with floating element type undirectional inlet valve. For clarity, floating valve element 54 is not sectioned.

Shown in FIGS. 8 and 9 is a version, of which the plan view is shown in FIG. 7, of the preferred embodiment with a floating-type unidirectional inlet valve, in which inlet valve seat 76 forms part of the inlet tube through which gas passing from container 71 through second opening 41 and through inlet tube entry 82 passes in turn into portion 89 of compressible internal chamber 90 of compressible-bodied vacuum pump 70. Component 91 shown in FIGS. 8 and 9 comprises conical form inlet valve seat 76 of cross-section axially tapering in the direction of the container 71 from a larger cross-sectional area to a smaller cross-sectional area end. Component 91 further comprises a flange 77 having a central axial hole 85 which serves as the axial hole of the inlet tube of the vacuum pump and forms an axial continuation in the direction of the container 71 of the smaller cross-sectional area end of the valve seat 76. Flange 77 supports valve seat 76, couples valve seat 76 to the second opening 41 of the container 71, which opening 41 permits egress of gas from container 71, and by means of mounting means 79, shown in FIGS. 8 and 9 as an exemplary snap-in groove 79 around the periphery of flange 77, acts as a mounting for portion 72 of the vacuum pump and thus for the whole body thereof,. Transverse planar face 78 of component 91 is affixed by a conventional adhesive material 98 to, or molded integrally with, external surface 92 of container 71 so that hole 82 of component 91 centrally coincides with second opening 41 of bag 71, so that gas can pass from container 71 through the inlet tube valve combination into portion 89 of the compressible internal chamber 90. In addition, component 91 contains in inlet tube 85 and arranged around the internal surface of inlet tube 85 in a plane normal to the axis of inlet tube 85 a raised molding 83 having a planar surface 84 normal to the axis of inlet tube 85 and distal from the valve seat 76, forming part of a novel locking device for the purposes of this present invention, which, as described below, locks the valve element 74 shut on to valve seat 76 to prevent gas from leaking back into container 71 during storage.

In FIGS. 8 and 9 floating valve element 74 has a conical seating face 75 axially tapering in the direction of container 71 from a larger transverse cross-sectional area to a smaller transverse cross-sectional area to fit valve seat 76 to form a gas-tight seal. Valve element 74 also has a first extension 80 axial to valve element 74 in the direction of hole 82, with in a plane normal to the axis of the valve an axially tapered molding 81 having a planar surface 93 normal to the axis of valve element 74 and proximal to the seating face 75 of valve element 74, said planar surface 93 being at the same distance from the plane of the transverse cross-section of the valve element 74 having the smallest diameter as the distal planar surface 84 of raised molding 83 is from the plane of the transverse cross-section of valve seat 76 having the same diameter. Floating valve element 74 also has a second axial extension 86 at the opposite end of valve element 74 to first extension 83. Second extension 86 is of such a length that its end 95 distal from valve seating face 75 is within close proximity, which for the purposes hereof may be approximately three millimeters, to inner surface 94 of internal chamber portion 89, so that sufficient force applied to flexibly resilient external surface 73 thereof in the proximity of end 95 firstly moves inner surface 94 into contact with end 95 of second valve element extension 86, secondly moves valve element 74 so that valve element seating face 75 forms a gas-tight seal with valve seat 76, and thirdly moves tapered molding 81 through raised molding 83 of inlet tube 85 so that planar surface 93 of tapered molding 81 snaps over and locks shut against surface 84 of raised molding 83, thus locking valve element 74 shut against seat 76 and preventing leakage of gas from chamber portion 89 between valve seat 76 and valve element 74 seating face 75 through inlet tube 85 into container 71.

It will thus be seen that second axial extension 86 to floating valve element 74 has two distant functions, which are for limiting the travel of floating valve element 74 so that it cannot fall out of its position within valve seat 76 when the apparatus which is the subject of this invention is angularly moved, and for providing a reference point for the application of force on external surface 73 to lock valve element seating face 75 shut against valve seat 76.

It will also be seen that the operation of the compressible-bodied vacuum pump 70 shown in FIGS. 7, 8, and 9 in exhausting gas from container 71 is identical in principle to the operation of the conventional compressible-bodied vacuum pump shown in FIG. 1 and described above. That is to say, manual depression of, or in other words the application of external force on, the wall 96 of the internal chamber 90 reduces the volume of chamber 90, causing gas in chamber 90, including by definition chamber portion 89, to make its egress through outlet 97 by opening valve flap 87 while simultaneously the increased pressure of said gas closes seating face 75 of valve element 74 on to valve seat 76, preventing ingress of gas through hole 81 of inlet tube 85 and second opening 41 into container 71 and completing the pumping cycle of vacuum pump 70. Release of the external force on wall 96 causes the flexibly resilient wall 96, shown as ribbed in FIGS. 7 and 9 to increase its flexible resilience, to tend to regain the shape it had held in the absence of external force and thereby expand the volume of internal chamber 90, thus reducing the gas pressure therein, which in turn draws valve flap 87 closed on to valve seat 88 so that no gas can enter internal chamber 90 through outlet 97, and lifts open seating face 75 of floating valve element 74 from its seat on valve seat 76 thus drawing gas through inlet tube 85 and second opening 41 from container 71, thus commencing the next pumping cycle of compressible-bodied vacuum pump 70. It is an added useful feature of this compressible body type of vacuum pump, which, it will be appreciated, extracts gas from the container in discrete pulses, that partial gas extraction, if desired, is possible. Another useful feature is that, when all gas has been exhausted from the container, the body vacuum pump 70 will not return to its undeformed position, thus informing the user that complete exhaustion of the gas has taken place.

FIG. 10 shows the plan view of yet another version of the preferred embodiment of this present invention, in which the second opening of the container, that for the egress of gas to the vacuum pump, is arranged through the sealing means of the container's first opening, that for introduction and extraction of storable matter. In FIG. 10 storage container 120, which for the purposes of this description is shown as a flexible food storage bag having for its sealing means interlocking rib strip closure 121, is shown with the upper surface of container 120 removed along the line shown as 131—131 soley for clarity in the drawing and this description. Probe 122 is in the form of a tube made of flexibly resilient material of the flattened circular or oval transverse cross-section shown in FIG. 11, which is a sectional view taken on line 11—11 of FIG. 10. Probe 122 has axial hole 123 which acts as the inlet tube for the vacuum pump in this version of the preferred embodiment of the invention, and has a proximal end having first opening 127 and a distal end having second opening 128, proximal and distal meaning in this context to and from container 120 respectively when in combination therewith. Probe 122 also has axially and circumferentially around its external surface sealing means 124 which are made in such a form as to interlock when desired with the sealing means shown in FIG. 10 as interlocking strip closure 121 of container 120, for sealing the entry of probe 122 into container 120 against ingress of gas thereinto. Probe 122 also has axially and circumferentially around the internal surface of hole 123 sealing means 125, which for the purposes of this description are ribs capable of interlocking and are molded into the internal surface of hole 123. Other means may be employed for sealing means 125, and it is not intended to restrict the sealing means to those particularly described herein; for example, the sealing means might be a pressure-sensitive adhesive. Sealing means 123 is operated by the application, for example by manual pinching, of external compressive force to probe 122 at or near the portion of probe 122 where sealing means 123 is internally located. Said compressive force forces together the portion of sealing means 125 which are located on opposite sides of hole 123 and which then interlock, thus sealing the hole 123 against passage of gas therethrough.

FIG. 12 shows a section of probe 122 taken on line 12—12 of FIG. 10, and showing in addition the coupling of probe 122 to the vacuum pump inlet tube extension 130 by means of the male-threaded portion 126 of probe 122 screwed into female-threaded portion 129 of vacuum pump inlet tube extension 130. Said coupling may be by any gas-tight means means and it is not intended to restrict the coupling to the type particularly described herein. The vacuum pump may be of any conventional type, including but not limited to the compressible-body type of vacuum pump shown in FIG. 1 and the Venturi-body type of vacuum pump shown in FIGS. 13 and 14. In FIG. 12 the external sealing means 124 is shown, as is the internal sealing means 125.

Figure 13:
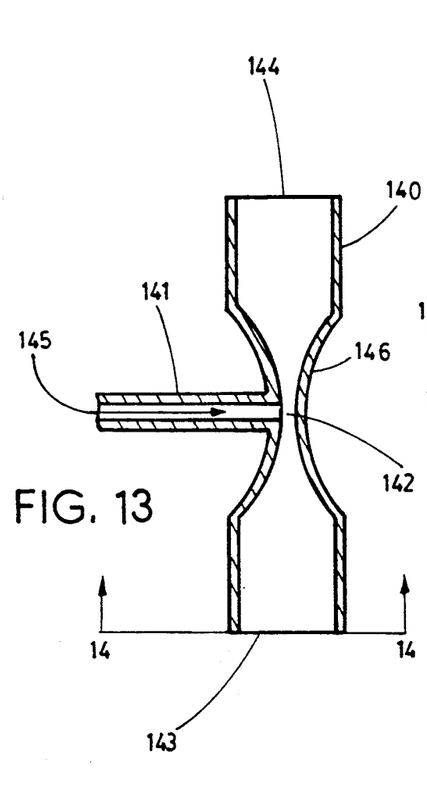
FIG. 13 is a sectional plan view taken on line 13—13 of FIG. 14, and illustrates a conventional Venturi-type vacuum pump, to be employed in this invention in combination with the probe illustrated in FIGS. 10, 11 and 12.
Figure 14:
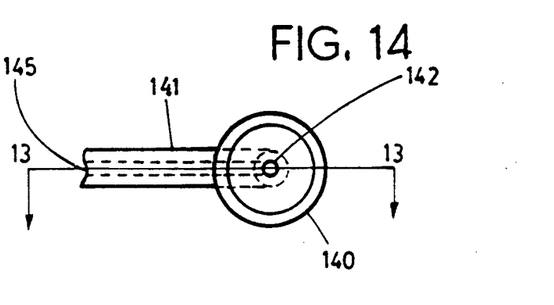
FIG. 14 is a view of the conventional Venturi-type pump of FIG. 13, taken axially to the Venturi tube.

To extract gas from container 120 in accordance with the version of the preferred embodiment of this invention as shown in FIGS. 10, 11, and 12, sealing means 121 of container 120 is opened enough to admit the proximal end of probe 122 having first opening 127. The proximal end of probe 122 is then inserted into container 120 until sealing means 124 of probe 122 is located coincident with sealing means 121 of container 120. In the example of this version of the preferred embodiment shown in FIGS. 10 and 11, said location means that the interlocking ribs of sealing means 124 are positioned to interlock with the interlocking ribs of sealing means 121. Sealing means 121 and 124 are then interlocked, in the example shown in FIGS. 10 and 11 by pressing sealing means 121 and 124 together so that their respective interlocking ribs form a gas-tight seal, for preventing gas from leaving container 120 through the opening made through sealing means 121 for the introduction into container 120 of probe 122, other than by first opening 127 of probe 122. A vacuum pump of conventional type, such as but not limited to those shown in FIGS. 1, 13, and 14 is then coupled to coupling means 126 of the distal end of probe 122 and operated so as to extract gas through hole 123 and out of second opening 128, and thence to atmosphere through the vacuum pump. It will be understood that probe 122 therefore effectively is the inlet tube of the vacuum pump. When all gas has been extracted from container 120, probe 122 is locked closed by being subjected to compressive external force, such as manual pinching, in the area of location of internal sealing means 125 so that sealing means 125 forms a gas-tight seal, locking hole 124 of probe 122 against passage of gas from the direction of the vacuum pump, and thus maintaining a vacuum in container 120 over extended storage periods, and thereby rendering container 120 capable of storing matter out of contact with gas. After use of probe 122 to extract gas from container 120, and of internal seal 125 to prevent re-entry of gas into container 120 through inlet tube probe 122, the vacuum pump may be disconnected from coupling means 126 and used for similar or other purposes elsewhere. Storage container 120, however, retains the inserted and internally and externally sealed probe 122 in position for as long as gas-free storage is required.

FIG. 14 is a view taken normal to line 14—14 of FIG. 13, which shows in turn a sectional view taken on line 13-13 of FIG. 14. FIGS. 13 and 14 show an alternative type of conventional vacuum pump to that shown in FIG. 1. However, the vacuum pump shown in FIGS. 13 and 14, unlike that in FIG. 1, does not have inlet or outlet valves, and so cannot be used in combination with the inlet tube locking devices shown in FIGS. 3, 4, 5, 6, 8, and 9, which are arranged as part of the respective vacuum pump inlet valves. As will be apparent from the following description, the version of the preferred embodiment of the novel combination of container and vacuum pump with inlet tube locking device, which combination is the subject of the present invention, when having a vacuum pump of the type shown in FIGS. 13 and 14, requires a vacuum pump with inlet tube and inlet tube locking means comprising inlet tube probe 122 and inlet tube internal 125 and external 124 sealing means of the type illustrated by FIGS. 9, 10, and 11.

In FIGS. 13 and 14 first tube 140, having an axial hole therethrough, which may be most conveniently of a circular transverse cross-section but is not to be understood as being restricted thereto for purposes of this invention, and has first opening 143 for forced introduction of gas, and second opening 144 for expulsion of said gas, has an axial portion 146 in which the diameter of tube 140 is constricted to an area 142 in which said diameter is of a minimum size. In the pumping application for which tube 140 is employed in this present invention, tube 140 is generally known as a Venturi tube. It is well-known in the art that, according to Bernoulli's theorem of fluid dynamics, where, as in he case of vacuum pumps forming components of the combinations of the present invention, which extract gas from storage containers, the effect of change of height of the gas is negligible, the higher the velocity of the gas when passing between first opening 143 and second opening 144 of tube 140 shown in FIG. 13, the lower is the gas pressure. It therefore follows that the gas pressure will be lowest where the gas velocity is highest, that is, where the diameter of tube 140 is smallest, which is the case at constricted area 142 of tube 140. Arranged with a gas tight joint through the wall of portion 146 of tube 140, for example by molding or attaching by means of conventional adhesive, and approximately normal to the axis of tube 140 is second tube 141, having axial hole 145 of an internal diameter approximately equal to the constricted diameter of tube 140 at area 142. Tube 141 has at its end distal from tube 140 a coupling device such as the exemplary coupling 129 illustrated in FIG. 12, for coupling the Venturi-type pump shown in FIGS. 13 and 14 to the probe 122 shown in FIGS. 10, 11, and 12. The Venturi-type pump shown in FIGS. 13 and 14 is operated by forcing gas, such as air, through first opening 143 in FIG. 13 so that it passes through area 142 of tube 140 and out to atmosphere through second opening 144. The forcing of such air through tube 140 may be conveniently accomplished by a person blowing into first opening 143, or by mechanical means such as a gas compressor. On passing through area 142 of constricted diameter the gas is reduced in pressure as described above, and gas is thereby drawn through hole 145 of tube 141, and thereby through probe 122, acting as the inlet tube of the vacuum pump, from container 120 illustrated in FIG. 10. The gas from container 120 is then expelled with the rest of the gas flowing through tube 140 through second opening 144 to the atmosphere. After all gas has been extracted from container 120, probe 122 is pinched as previously described in the area of internal sealing means 125 so that hole 123 of probe 122 is locked closed against any passage of gas through hole 123 into container 120, and the Venturi-type vacuum pump illustrated in FIGS. 13 and 14 may be removed for re-use.

The foregoing description of the invention has been directed primarily to a particular preferred embodiment in accordance with the applicable statutes and for the purposes of explanation and illustration. It will be apparent, however, to those skilled in the art that modifications and changes in the specifically described apparatus may be made within the scope and true spirit of the present invention in addition to the alternative versions of the preferred embodiment described above. It is the applicant's intention in the following claims to cover such modifications and changes.

What is claimed is:

1. An apparatus for storing matter without contact between said matter and gas, comprising: a container having interior and exterior surface and a first opening for introduction and extraction of said storable matter, said first opening having a sealing means against ingress of gas, and said container having a second opening for egress of gas; a vacuum pump coupled to said second opening for extracting gas from said container, said vacuum pump in turn comprising a compressible body made of flexibly resilient material, having an internal compressible chamber with walls, said body and chamber having a tendency to contract in volume under external force applied to said walls and to expand on release of said force; an inlet tube having a proximal end coupled through a wall of said chamber for accepting gas from the second opening of the container, and a distal end located within the chamber; a unidirectional inlet valve arranged at the distal end of said inlet tube for permitting egress of gas from said inlet tube into the chamber and preventing ingress of gas from the chamber into said inlet tube and therefrom into the container; a means arranged on said inlet tube of locking said inlet tube shut against ingress of gas therethrough from the chamber into the container after gas is extracted therefrom by said vacuum pump; and a unidirectional outlet valve arranged in a portion of said walls distal from the container for permitting egress of gas from the chamber and presenting ingress of gas thereinto.

2. An apparatus as claimed in claim 1 of which all elements of the vacuum pump are made of polyethylene.

3. An apparatus as claimed in claim 1 of which all elements of the vacuum pump are made of polypropylene.

4. An apparatus as claimed in claim 1 in which a portion of the walls of the body and the internal compressible chamber of said vacuum pump is ribbed to add resilience thereto for increasing the tendency of said compressible chamber to expand to its original volume after previously applied external force is released.

5. An apparatus as claimed in claim 1 in which a portion of a wall of the compressible chamber of said vacuum pump surrounding the proximal end of the inlet tube is molded integrally with the exterior surface of said container surrounding the second opening, so that substantially the whole of said inlet tube lies within the compressible chamber.

6. An apparatus as claimed in claim 1 in which a portion of a wall of the compressible chamber of said vacuum pump surrounding the proximal end of the inlet tube is affixed in gas-tight fashion to the exterior surface of said container surrounding the second opening, so that substantially the whole of said inlet tube lies within the compressible chamber.

7. An apparatus as claimed in claim 1 in which said vacuum pump is coupled to the second opening of said container by the inlet tube, but is otherwise separate from said container.

8. An apparatus as claimed in claim 1 in which the unidirectional inlet and outlet valves are made of polypropylene.

9. An apparatus as claimed in claim 1 in which the unidirectional outlet valve of the vacuum pump is a flap valve.

10. An apparatus as claimed in claim 1 in which the unidirectional inlet valve of the vacuum pump is a flap valve comprising:
   a valve seat of flexibly resilient material having a periphery coupled by the inlet tube to the second opening of the container and having a raised molding externally and circumferentially around and integral with said periphery and having a planar surface normal to the exterior surface of the inlet tube and distal from the valve seat;
   a valve flap hinged at said periphery and having on its side proximal to the valve seat a seating surface of diameter equal to the outside diameter of the valve seat to provide a gas-tight seal with the valve seat, said flap having around the periphery of the seating surface a re-entrant molding of an equal axial depth from the seating face as that of the planar surface distal from the valve seat of the raised molding of the valve seat is from the valve seat and arranged to fit around the raised molding of the valve seat, for locking the valve flap shut into gas-tight sealing contact with the valve seat against ingress of gas through the inlet tube into the container by snapping said re-entrant molding over the raised molding by application of sufficient force to the valve flap in a valve-closing direction.

11. An apparatus as claimed in claim 1 in which the unidirectional inlet valve of the vacuum pump is a floating-type valve, comprising:
   a conical form valve seat of cross-section axially tapering in the direction of the container from a larger cross-sectional area to a smaller cross-sectional area end;
   a flange affixed to the container, centrally aligned with the second opening of said container, and having a central axial hole for serving as the axial hole of the inlet tube and forming an axial continuation in the direction of the container of the smaller cross-sectional area end of the valve seat, said flange supporting said valve seat, coupling said valve seat to the second opening of the container, and being a mounting for the body of the vacuum pump;
   a raised molding of flexibly resilient material having an planar surface distal from the valve seat and arranged around the internal surface of said inlet tube in a planar normal to the axis of said tube;
   a floating valve element having a conical seating face axially tapering in the direction of the container from a larger cross-sectional area to a smaller cross-sectional area to fit the valve seat for forming a gas-tight seal;
   a first extension axial to the valve element in the direction of the container, with, in a planar normal to the axis of the valve, an axially tapered molding having a planar surface proximal to the seating face of the valve element, the plane of said proximal planar surface being at the same distance from the plane of the transverse cross-section of the valve element having the smallest diameter as the distal planar surface of the raised molding is from the plane of the transverse cross-section of the valve seat having the same diameter, for locking the valve element shut into gas-tight sealing contact with the valve seat against ingress of gas through the inlet tube into the container by snapping said axially tapered molding through said internal raised molding of the inlet tube by application of sufficient force to the valve element in a valve closing direction; and a second extension axial to the valve element at the end thereof opposite to the first extension, said second extension being of such a length as to be in close proximity to a wall of the compressible chamber, for limiting the travel of the floating valve element and providing a reference point on which to apply force to lock the valve.

12. An apparatus as claimed in claim 1 in which the second opening is arranged through the sealing means of the first opening, the means of locking the inlet tube shut against ingress of gas is incorporated internally in the inlet tube and said inlet tube of the vacuum pump comprises: a tubular probe of flattened circular transverse cross-section with a proximal end for inserting through the sealing means of the first opening of the container, and a distal end for coupling to the vacuum pump, said probe having an axial hole therethrough and an external surface;
   means arranged circumferentially around the external surface of the probe for interlocking with the sealing means of the first opening when the proximal end of the probe is within the container, for sealing the entry of the probe into the container against ingress of gas thereinto;
   sealing means within the internal axial hole of the probe, for sealing the internal axial hole of the probe serving as the inlet tube shut against ingress of gas therethrough into the container when the probe is subjected to external compressive force at the area of location internally of said probe sealing means; and a coupling means at the distal end of the probe for coupling to the vacuum pump.

13. An apparatus as claimed in claim 12 in which the sealing means of the first opening is of the interlocking rib type.

14. An apparatus as claimed in claim 12 in which the sealing means within the internal axial hole of the probe is of the interlocking rib type.

15. An apparatus for storing matter without contact between said matter and gas, comprising:
   a container having interior and exterior surface and a first opening for introduction and extraction of said storable matter, said first opening having a sealing means against ingress of gas, and said container having a second opening for egress of gas; and a vacuum pump for extracting gas from said container, said vacuum pump in turn comprising
   a vacuum pump inlet leading from said outlet opening of said container in a direction away from said container, said inlet tube having an end proximal to said container and an end distal from said container, the periphery of the proximal end being imperviously attached completely around, and to, the periphery of said second opening of the container;
   an inlet unidirectional valve arranged at said distal end of said inlet tube for permitting egress of gas through said distal end of said inlet tube in a direction outward from said container and for preventing ingress of gas into said distal end of said inlet tube and passing therethrough into said container;
   a means arranged on said unidirectional inlet valve of locking said unidirectional inlet valve shut against ingress of gas through the inlet tube into said container after gas is extracted therefrom by said vacuum pump;
   a compressible body made of flexibly resilient material having an internal compressible chamber with walls, said body and chamber having a tendency to contract in volume under external force applied to said walls and expand on release of said force, and having arranged through a wall of said internal compressible chamber said inlet tube so affixed to said wall that the end of the tube distal from said container is within said compressible chamber and that the wall is in impervious contact with the external transverse periphery of the tube, and said compressible body having an outlet opening in a wall thereof distal from said container; and a unidirectional outlet valve arranged in a portion of said walls distal from the container for permitting egress of gas from the chamber and preventing ingress of gas thereinto.

16. An apparatus as claimed in claim 15 in which all elements of the vacuum pump are made of polyethylene.

17. An apparatus as claimed in claim 15 in which all elements of the vacuum pump are made of polypropylene.

18. An apparatus as claimed in claim 15 in which a portion of the walls of the body and the internal compressible chamber of said vacuum pump is ribbed to add resilience thereto for increasing the tendency of said compressible chamber to expand to its original volume after previously applied external force is released.

19. An apparatus as claimed in claim 15 in which a portion of a wall of the compressible chamber of said vacuum pump surrounding the proximal end of the inlet tube is molded integrally with the exterior surface of said container surrounding the second opening, so that substantially the whole of said inlet tube lies within the compressible chamber.

20. An apparatus as claimed in claim 15 in which a portion of a wall of the compressible chamber of said vacuum pump surrounding the proximal end of the inlet tube is affixed in gas-tight fashion to the exterior surface of said container surrounding the second opening, so that substantially the whole of said inlet tube lies within the compressible chamber.

21. An apparatus as claimed in claim 15 in which said vacuum pump is coupled to the second opening of said container by the inlet tube, but is otherwise separate from said chamber.

22. An apparatus as claimed in claim 15 in which the unidirectional inlet and outlet valves are made of polypropylene.

23. An apparatus as claimed in claim 15 in which the unidirectional outlet valve of the vacuum pump is a flap valve.

24. An apparatus as claimed in claim 15 in which the unidirectional inlet valve of the vacuum pump is a flap valve comprising:
   a valve seat of flexibly resilient material having a periphery coupled by the inlet tube to the second opening of the container and having a raised molding externally and circumferentially around and integral with said periphery and having a planar surface normal to the exterior surface of the inlet tube and distal from the valve seat;
   a valve flap hinged at said periphery and having on its side proximal to the valve seat a seating surface of diameter equal to the outside of the valve seat to provide a gas-tight seal with the valve seat, said flap having around the periphery of the seating surface a re-entrant of an equal axial depth from the seating face as that of the planar surface distal from the valve seat of the raised molding of the valve seat is from the valve seat and arranged to fit around the raised molding of the valve seat, for locking the valve flap shut into gas-tight sealing contact with the valve seat against ingress of gas through the inlet tube into the container by snapping said re-entrant molding over the raised molding by application of sufficient force to the valve flap in a valve-closing direction.

25. An apparatus as claimed in claim 15 in which the unidirectional inlet valve of the vacuum pump is a floating-type valve, comprising:
   a conical form valve seat of cross-section axially tapering in the direction of the container from a larger cross-sectional area to a smaller cross-sectional area end;
   a flange affixed to the container, centrally aligned with the second opening of said container, and having a central axial hole for serving as the axial hole of the inlet tube and forming an axial continuation in the direction of the container of the smaller cross-sectional area end of the valve seat, said flange supporting said valve seat, coupling said valve seat to the second opening of the container, and being a mounting for the body of the vacuum pump;
   a raised molding of flexibly resilient material having an planar surface distal from the valve seat and arranged around the internal surface of said inlet tube in a plane normal to the axis of said tube;
   a floating valve element having a conical seating face axially tapering in the direction of the container from a larger cross-sectional area to a smaller cross-sectional area to fit the valve seat for forming a gas-tight seal;

a first extension axial to the valve element in the direction of the container, with, in a plane normal to the axis of the valve, an axially tapered molding having a planar surface proximal to the seating face of the valve element, the plane of said proximal planar surface being at the same distance from the plane of the transverse cross-section of the valve element having the smallest diameter as the distal planar surface of the raised molding is form the plane of the transverse cross-section of the valve seat having the same diameter, for locking the valve element shut into gas-tight sealing contact with the valve seat against ingress of gas through the inlet tube into the container by snapping said axially tapered molding through said internal raised molding of the inlet tube by application of sufficient force to the valve element in a valve closing direction; and a second extension axial to the valve element at the end thereof opposite to the first extension, said second extension being of such a length as to be in close proximity to a wall of the compressible chamber, for limiting the travel of the floating valve element and providing a reference point on which to apply force to lock the valve.

26. An apparatus as claimed in claim 15 in which the second opening is arranged through the sealing means of the first opening, the means of locking the inlet tube shut against ingress of gas is incorporated internally in the inlet tube and said inlet tube of the vacuum pump comprises:

a tubular probe of flattened circular transverse cross-section with a proximal end for inserting through the sealing means of the first opening of the container, and a distal end for coupling to the vacuum pump, said probe having an axial hole therethrough and an external surface;

means arranged circumferentially around the external surface of the probe for interlocking with the sealing means of the first opening when the proximal end of the probe is within the container, for sealing the entry of the probe into the container against ingress of gas thereinto;

sealing means within the internal axial hole of the probe, for sealing the internal axial hole of the probe serving as the inlet tube shut against ingress of gas therethrough into the container when the probe is subjected to external compressive force at the area of location internally of said probe sealing means; and a coupling means at the distal end of the probe for coupling to the vacuum pump.

27. An apparatus as claimed in claim 26 in which the sealing means of the first opening is of the interlocking rib type.

28. An apparatus as claimed in claim 26 in which the sealing means within the internal axial hole of the probe is of the interlocking rib type.

29. An apparatus for storing matter without contact between said matter and gas, comprising:

a container having interior and exterior surface and a first opening for introduction and extraction of said storable matter, said first opening having a sealing means against ingress of gas, and said container having a second opening for egress of gas;

a vacuum pump coupled to said second opening for extracting gas from said container, said vacuum pump in turn comprising a first tube having a wall, with a first end for forced introduction of gas, a second end for expulsion of said gas, and an axial hole having an area intermediate between said ends in which area the diameter of said hole is constricted;

a second tube having an exterior surface, having its axis approximately normal to that of the first tube, and having an axial hole of approximately the same diameter as that of the constricted area of the hole of the first tube, arranged through the wall of the first tube so that the axial hole of the second tube opens into the constricted area of the axial hole of the first tube and so that the exterior surface of the second tube and the wall of the first tube form a gas-tight joint;

a tubular probe with a proximal end for inserting through the sealing means of the first opening of the container and a distal end for coupling to the second tube of the vacuum pump, said probe having an axial hole therethrough and serving as the inlet tube of the vacuum pump;

means arranged around external surface of the probe for interlocking with the sealing means of the first opening when the proximal end of the probe is within the container, for sealing the entry of the probe into the container against ingress of gas thereinto;

an interlocking rib type sealing means within the internal axial hole of the probe, for sealing the internal axial hole of the probe serving as the inlet tube shut against ingress of gas therethrough into the container when the probe is subjected to external compressive force at the area of location internally of said probe sealing means; and a coupling means at the distal end of the probe for coupling to the second tube of the vacuum pump;

means of forcing gas through the first tube for reducing gas pressure at the constricted area and for thereby drawing gas from the container through the probe and through the second tube.

* * * * *